(12) United States Patent
Strashny

(10) Patent No.: US 6,229,299 B1
(45) Date of Patent: May 8, 2001

(54) SYSTEM AND METHOD FOR COMPUTING THE ANGULAR VELOCITY AND DIRECTION OF A ROTATIONAL BODY

(75) Inventor: Igor Strashny, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/193,601

(22) Filed: Nov. 17, 1998

(51) Int. Cl.[7] .............................. G01P 3/487; G01P 13/00; G01P 3/44
(52) U.S. Cl. .................. 324/174; 324/165; 324/166; 324/207.2; 340/672; 702/147
(58) Field of Search .................... 324/160, 162, 324/163, 165, 166, 173, 174, 175, 207.2, 207.21, 207.25; 702/145–148; 340/672

(56) References Cited

U.S. PATENT DOCUMENTS

| | | |
|---|---|---|
| 3,805,034 * | 4/1974 | Klein et al. ................ 324/166 X |
| 4,228,396 * | 10/1980 | Palombo et al. ................ 324/163 |
| 4,807,164 * | 2/1989 | Onyon ........................ 324/166 X |
| 4,868,497 * | 9/1989 | Wallrafen .................... 324/165 X |
| 5,336,996 | 8/1994 | Rusnak ........................ 324/207.2 |
| 5,570,013 | 10/1996 | Polinsky et al. ................ 324/174 |
| 5,602,472 | 2/1997 | Bergstedt et al. ............. 324/207.25 |
| 5,631,556 | 5/1997 | Shibata et al. ................. 324/174 |
| 5,670,877 | 9/1997 | Scheiber ..................... 324/207.25 |
| 5,682,095 | 10/1997 | Mathes et al. .................. 324/174 |
| 5,712,560 * | 1/1998 | Maeda et al. ............... 324/207.2 X |
| 5,721,486 * | 2/1998 | Pape ........................... 324/166 X |

* cited by examiner

Primary Examiner—Gerard R. Strecker
(74) Attorney, Agent, or Firm—R. Carl Wilbur; W. Bryan McPherson, III

(57) ABSTRACT

A sensor is positioned to sense the magnetic field strength of a magnet associated with a rotating body. The sensor produces a signal having a sinusoidal output as the magnet rotates with the rotating body. A controller takes a derivative of the output and calculates the rotational velocity of the rotational body as a function of the derivative.

3 Claims, 3 Drawing Sheets

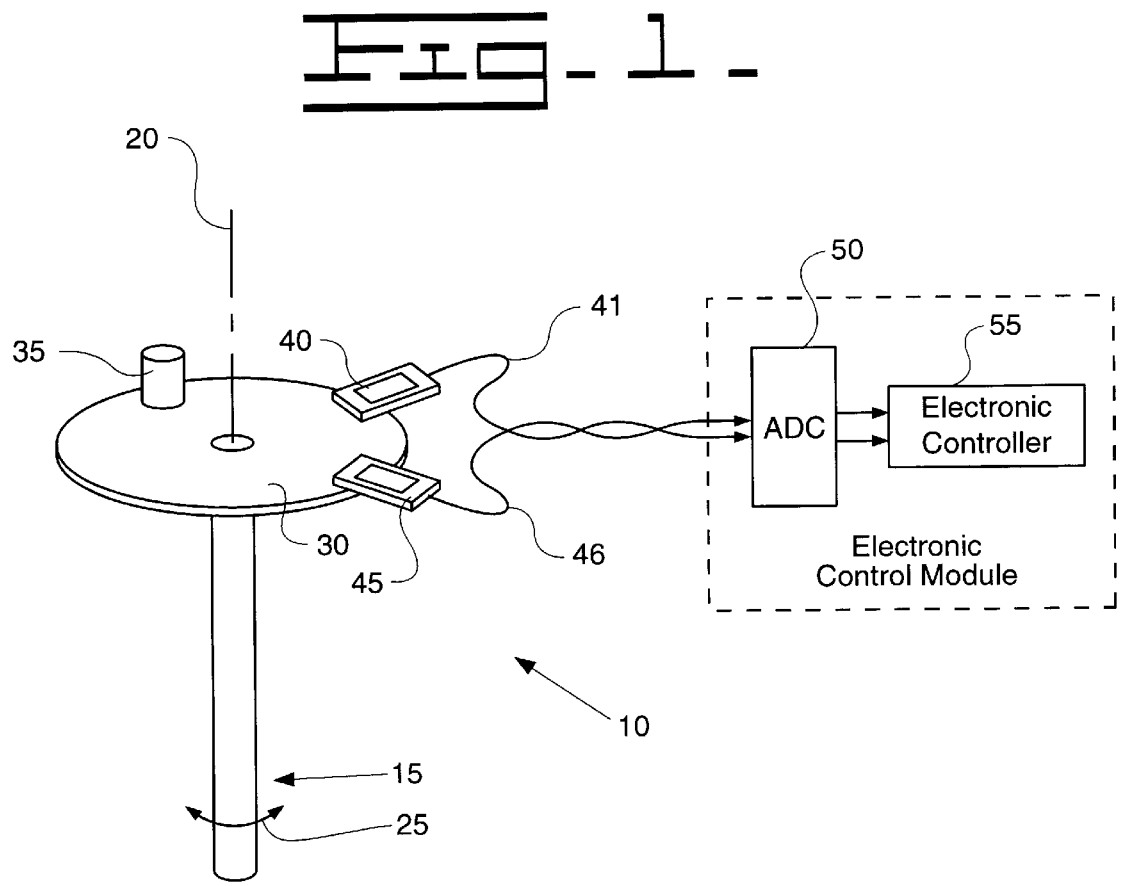
Fig-1-
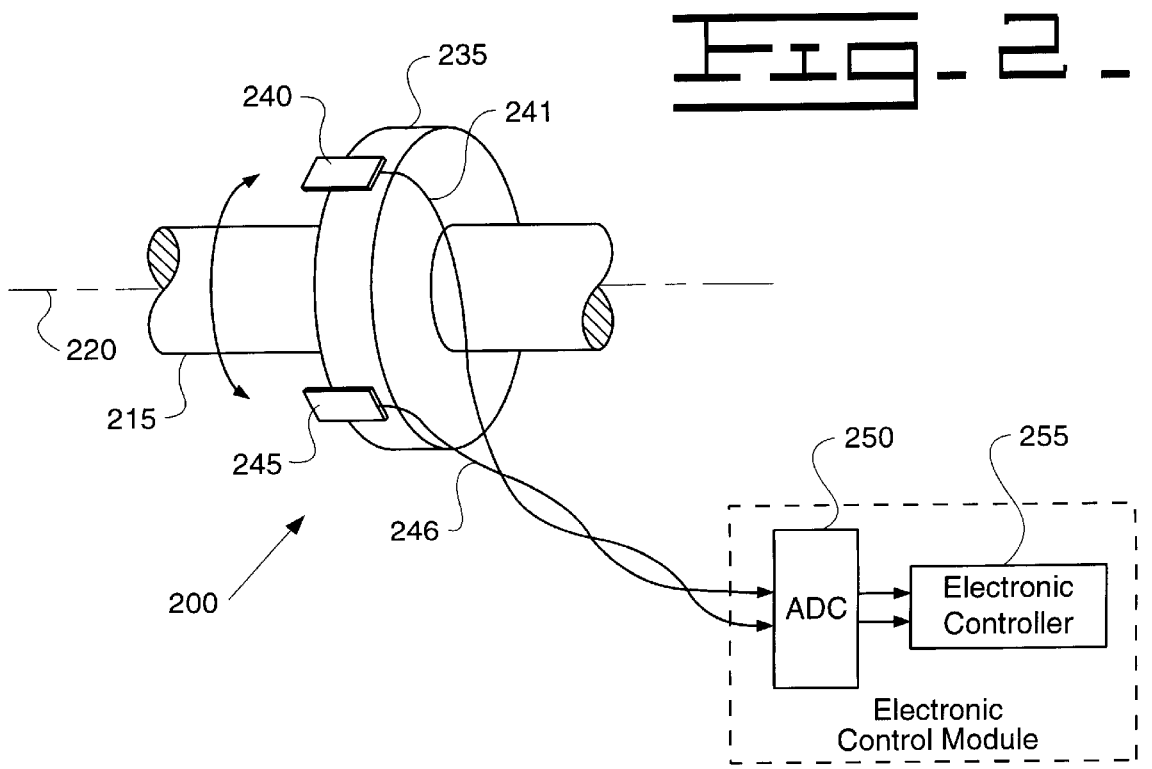
Fig-2-

SYSTEM AND METHOD FOR COMPUTING THE ANGULAR VELOCITY AND DIRECTION OF A ROTATIONAL BODY

DESCRIPTION

1. Technical Field

The present invention relates to sensing the velocity of a rotational body and, more particular, to a novel method and apparatus for sensing shaft rotation.

2. Background Art

It is important in many different control applications to sense the angular velocity of a shaft or other rotating object. Such applications include engine speed sensing, transmission speed sensing, and anti-skid brake systems, among others. There are a number of known devices for measuring angular position and rotational speed of a rotating object that have been used in these applications with varying degrees of success.

One such prior art system relies on passive variable reluctance sensing elements that are positioned proximate to a toothed gear or wheel. As the gear passes close to such a sensor, the reluctance changes and there is a small increase in the voltage output of the sensor. Although these devices generally perform satisfactorily, they suffer from two primary disadvantages: (1) the quality of the output signal is largely dependent on the distance between the sensing element and the gear or wheel (i.e., the distance should be small for best signal characteristics); and (2) the amplitude of the output signal decreases as the rotational speed decreases. The first of these disadvantages results in higher manufacturing costs associated with more accurate placement and closer tolerances of the sensing element adjacent to the outer circumference of the rotating gear. Since the space is small, a slight misalignment during manufacturing or resulting from use may cause the sensing element to enter the path of the rotating gear and cause the rotating gear to damage the sensing element. As can be appreciated, sensor failure may cause equipment downtime and should be avoided. The second of the above-noted disadvantages, i.e., the decreasing magnitude of the sensor output voltage at lower rotational speeds, renders the passive variable reluctance sensing devices of limited use in measuring low rotational velocities.

There are still other shortcomings of variable reluctance sensors. At low speeds there is tendency for some gears to vibrate as the gear rotates. This can cause a high frequency signal to be superimposed on the low frequency signal produced by the revolution of the gear. It is possible for the controller to improperly interpret the high frequency signal as a high speed reading while the shaft is in fact turning at low speeds.

Because of the shortcomings of the variable reluctance sensing devices, some prior art systems position Hall effect sensors adjacent to the path of a magnet on the rotating body. As a rotating body turns around an axis, the Hall effect sensors sense the magnet passing near the sensor and produce signals. One such device is shown in U.S. Pat. No. 5,670,877 issued to Scheiber. The Scheiber reference discloses a system including two directional magnetic sensors located adjacent a rotating magnetic source. The sensors produce a signal in response to the magnetic source passing adjacent to the sensor. As disclosed in the Scheiber reference, the magnetic sensors are preferably flux gate magnetometers located proximate to an annular magnet which is attached to the surface of an axle. The magnetometers are preferably located 90 degrees apart with respect to the axis of the axle and produce signals in response to the changing magnetic flux generated by rotation of the annular magnet. One particular aspect of the invention is to eliminate erroneous readings resulting from magnetic interference or magnetic fields other than the rotating magnet. To do this, the reference discloses connecting the sensor outputs in series.

The sensors of systems such as the one disclosed in the Scheiber reference typically produce a sinusoidal output wave form. Such systems typically calculate the rotational speed of the rotating object by sampling the output signal and measuring the elapsed time from one peak of the sinusoid wave to the next peak. These systems generally work well when measuring higher rotational speeds. As the speeds decrease, however, the amount of time between peaks increases and can be a relatively long period of time as the speed approaches zero. This long period of time between speed readings is undesirable when using the speed signal in real time control applications. For example, if a control loop is several milliseconds long, as the speed of the rotational body decreases, it is possible for there to be no peak to peak speed readings during that control loop. Then, the control would have to rely on an old speed reading to implement the control.

Perhaps even a greater disadvantage of these systems is that it is difficult to measure zero rotational velocity. Because the output of the sensor depends on the changing magnetic flux generated by the passing gear teeth or magnet, the signal output will be a DC voltage at zero speed. Such systems cannot perform the peak to peak measurements required to calculate speed. In these instances, the speed reading would be indeterminate and unable to produce a reliable speed signal.

Accordingly, it is an object of the present invention to provide a method and apparatus for sensing the rotational velocity of a rotating body that is relatively accurate and not dependent on the speed of the object being measured and especially at low and zero speeds. Other objects of the invention as well as particular features, embodiments, and advantages thereof will be apparent to those skilled in the art upon reading the following description in connection with the drawings and claims.

DISCLOSURE OF THE INVENTION

In one aspect of the invention a system for sensing the rotational velocity of an object about a rotational axis is disclosed. The system includes a magnet fixed to the object whose rotational velocity is to be measured; a non-contacting sensor, senses the strength of the magnetic field; and an electronic controller, said controller receiving said signal calculating a derivative of said signal and calculating a rotational velocity of said object in response to said derivative.

In another aspect of the invention, a method for sensing the rotational velocity of an object is disclosed. The method includes the steps of determining a derivative of first and second signals produced by first and second non-contacting sensors; and calculating a velocity of said object as a function of the selected derivative.

These and other aspects and advantages of the present invention will become apparent upon reading the specification in connection with the drawings and claims.

BRIEF DESCRIPTION OF THE DRAWINGS

Understanding the present invention and the various aspects thereof will be facilitated by reference to the accompanying drawings, which are illustrative and are not intended to define the scope of the invention:

FIG. 1 shows a system level block diagram of an embodiment of the present invention.

FIG. 2 is a system level block diagram of an embodiment of the present invention in which a magnet is circumferentially attached to a shaft.

BEST MODE FOR CARRYING OUT THE INVENTION

Figure 3B:
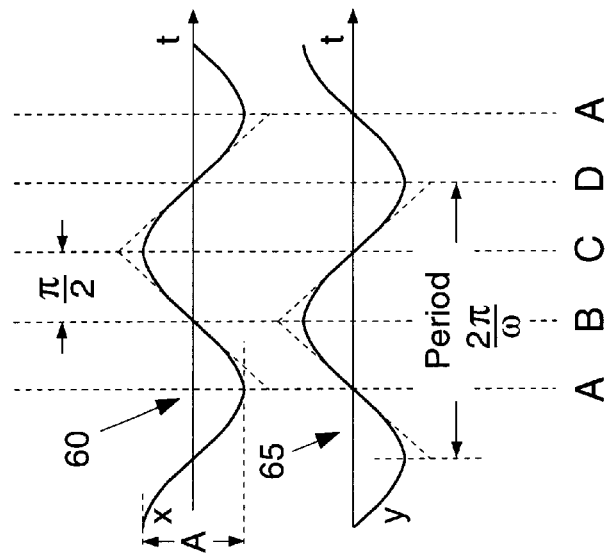
FIG. 3(b) is an exemplary illustration of signal outputs of sensors in FIG. 3(a).

Throughout this description and the drawings like elements will be referred to with consistent identifying element numbers throughout the various figures. The following description, in connection with the drawings, provides a full and complete description of several embodiments of the present invention. These embodiments, however, do not define the invention, but should be referred to as examples of the invention defined by the appended claims.

Referring first to FIG. 1, there is illustrated a system level diagram of the sensing system 10 of an embodiment of the invention. Included in the sensing system 10 is a shaft 15 rotably mounted on bearings or other known mounting systems (not shown) to permit the shaft 15 to rotate about axis 20 in the directions generally indicated by arrow 25. Mounted on the shaft 15 is a non-magnetic disc 30. Alternatively, the disc 30 may be replaced by an arm or other similar fixture such that it provides support for a magnet 35 and permits the magnet to travel about the axis 20 in a plane perpendicular to the axis 20 as the shaft 15 rotates. In other cases, it may be possible to mount the magnet 35 directly to the shaft 15 or end of the shaft such that the magnet 35 rotates eccentrically with respect to the axis 20 as the shaft 15 rotates. A first non-contacting sensor 40 and a second non-contacting sensor 45 are located proximate to the outer circumference of the arcuate path traveled by the magnet 35 when the shaft 15 rotates. In a preferred embodiment, the magnets used will preferably be magnetized in a manner that causes the sensors to produce relatively sinusoidal outputs. In the embodiment shown in FIG. 1, the sensors 40, 45 are generally located on a circumference of the non-magnetic disc 30 in a position such that the sensors 40 and 45 produce signals responsive to the passing of the magnet 35 near the sensors 40, 45. A first wire 41 is connected between the first non-contacting sensor 40 and an analog to digital converter 50. A second wire 46 is connected between the second non-contacting sensor 45 and a second input to the analog to digital converter 50. In a preferred embodiment, the non-contacting sensors 40, 45 comprise Hall effect sensors. However, other devices may be employed such as a magnetorisistive sensor or other sensors that can measure magnetic flux density.

As shown in FIG. 1, the first wire 41 and second wire 46 are preferably twisted to eliminate cross talk and external interference, as is known to those skilled in the art. Although an embodiment of the present invention shows twisted pair of wires 41,46, these wires can be directly connected to the analog to digital converter 50 in some applications, particularly where the lead wires 41,46 are relatively short. In a preferred embodiment, the signals produced by the first sensor 40 and second sensor 45 are inputs to the analog to digital converter 50. The analog to digital converter 50 converts the analog input signals to a digital form and inputs them to an electronic controller 55. As is known to those skilled in the art, there are various signal conditioning and input/output circuitry associated with electrical communications between an electronic controller and sensors. Such circuitry is well known in the art and, although not shown in the figures, nor described herein, would be included in each of the embodiments of the present invention where appropriate. Also, as is known to those skilled in the art, the electronic controller may be capable of processing analogue data or signals thereby alleviating the need for an analog to digital converter 50.

As will be described in more detail below, the electronic controller 55 samples the signals produced by the analog to digital converter 50 representative of the analog signals produced by the first and second non-contacting sensors 40, 45.

Referring now to FIG. 2, an alternative embodiment 200 of the present invention is shown. As shown in the figure, a shaft 215 is mounted on bearings or other mounting features (not shown) so that it rotates about an axis 220. A circumferential magnet 235 is mounted on the shaft 215 in a plane perpendicular to the axis 220. The circumferential magnet shown in FIG. 1 generally represents a magnet having two poles and which is magnetized through the diameter preferably so that the magnetic flux along the outer circumference of said magnet varies as the shaft 215 rotates about the axis 220. Alternatively, a multipole magnet can be used that is magnetized through the thickness, in which case the first non-contacting sensor 240 and the second non-contacting sensor 245 should preferably be positioned such that the flux lines from the multipole magnet cross the sensors orthogonally. As is known to those skilled in the art, when the sensors 240,245 are positioned parallel to the magnetic flux lines, there is no output from the sensors as the shaft rotates. Thus, it is preferable to position the sensors as close to orthogonal to the magnetic flux lines as possible.

In the embodiment shown in FIG. 2, a first non-contacting sensor 240 and a second non-contacting sensor 245 are located proximate to the outer circumference of the circumferential magnet 235. The sensors 240, 245 generally produce signals as a function of magnetic flux density that varies with respect to angular position of the circumferential magnet 235 near the sensors 240, 245. A first wire 241 is connected between the first non-contacting sensor 240 and an input to an analog to digital converter 250. A second wire 246 is connected between the second non-contacting sensor 245 and the analog to digital converter 250. In a preferred embodiment, the non-contacting sensors 240, 245 comprise Hall effect sensors. However, other devices may be employed such as magnetoresistive sensors or other sensors capable of measuring magnetic flux density.

As shown in FIG. 2, the first wire 241 and second wire 246 are preferably twisted to eliminate cross talk and external interference, as is known to those skilled in the art. Although as described above, in some embodiments, it is not necessary to twist the wires 241,246. In a preferred embodiment, the signals produced by the first sensor 240 and second sensor 245 are inputs to the analog to digital converter 250. The analog to digital converter 250 converts the analog input signals to a digital form and inputs them to an electronic controller 255. As is known to those skilled in the art, there are various signal conditioning currently and input/output circuitry associated with communication between an electronic controller and sensors. Such circuitry is well known in the art and would be included in each of the embodiments of the present invention where appropriate.

Figure 3A:
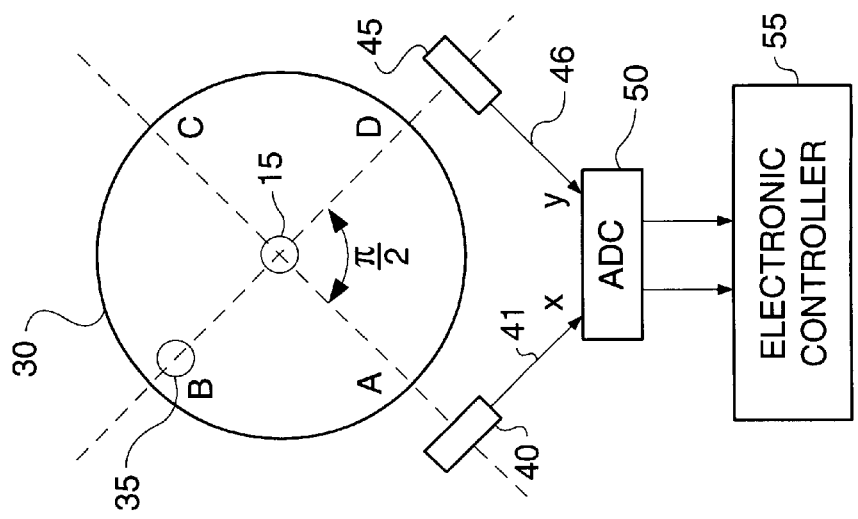
FIG. 3(a) is a top diagrammatic view of the embodiment of FIG. 1.

Referring now to FIG. 3(a), a top view of the embodiment of the sensor system 10 of FIG. 1 and FIG. 2 with two pole magnet is shown diagrammatically. The first non-contacting sensor 40 or 240 and the second non-contacting sensor 45 or 245 are located in a position to detect the magnetic field density as the magnet 35 or 235 passes adjacent the respective sensors 40 or 240, 45 or 245. The signals produced by the non-contacting sensors 40 or 240, 45, or 245 are transmitted to the analog to digital converter 50 or 250 across a first wire 41 or 241 and a second wire 46 or 246. The analog to digital converter 50 or 250 converts the analog sensor signal into digital format for the electronic controller 55 or 255.

Referring now to FIG. 3(b), a representative first signal 60 produced by the first non-contacting sensor 40 or 240 and a second signal 65 produced by the second non-contacting sensor 45 or 245 is shown. As shown in the figure, the amplitude A represents a measured voltage difference between the maximum or peak value of the input signal and the minimum value. Also, as shown in the figure, the non-contacting sensors 40 or 240, 45 or 245 are preferably 90 degrees from one another which causes the signals produced by the sensors 40 or 240, 45 or 245 to be 90 degrees out of phase.

Figure 4:
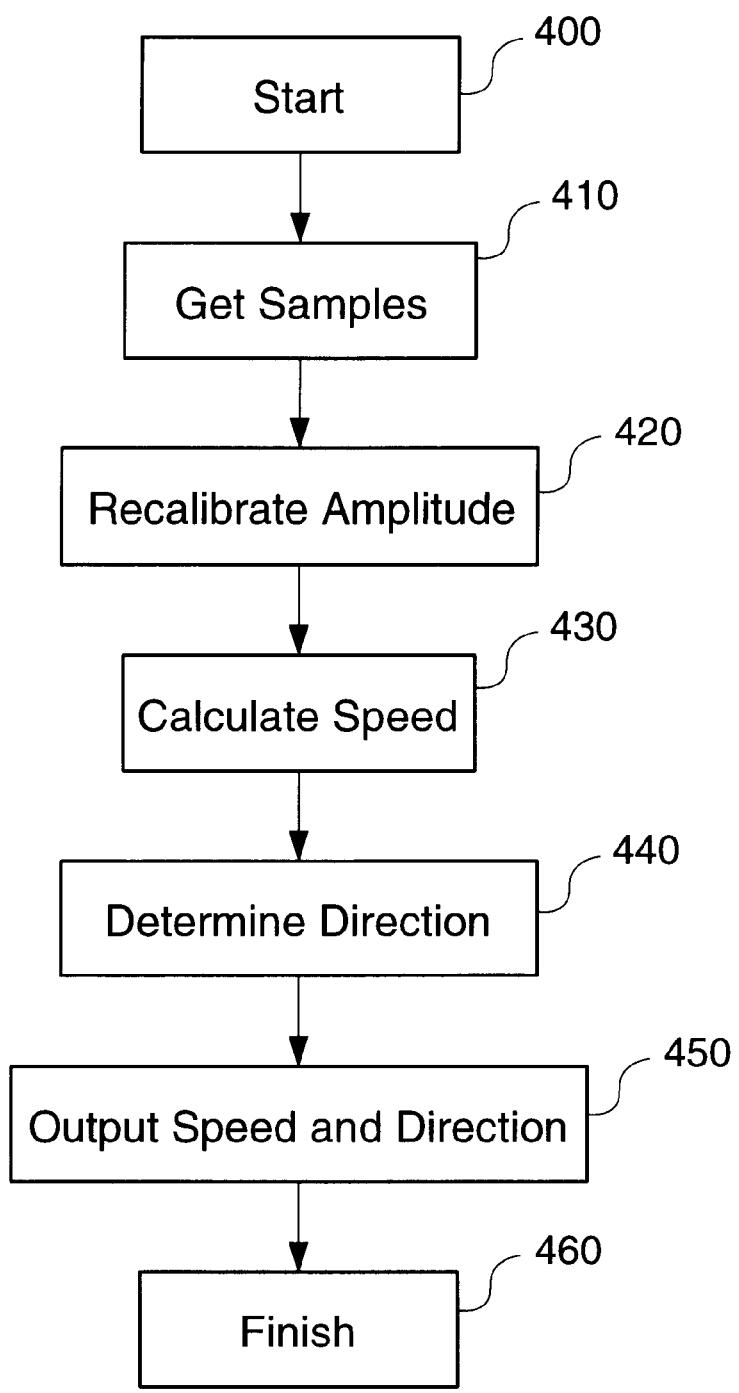
FIG. 4 is a flow chart of software associated with a preferred embodiment of the present invention.

Referring now FIG. 4, a flow chart of the operation of the electronic controller 55 in an embodiment of the present invention is shown. In block 400 program control begins. Program control then moves to block 410. In block 410, the electronic controller samples the signals produced by the analog to digital converter 50 representative of the analog signals produced by the first and second non-contacting sensors 40, 45 (shown generally in FIG. 3(b). Program control then moves to block 420.

In block 420, the electronic controller calculates the amplitude A of the first and second signal, compares the calculated value to a value stored in memory, and stores the calculated value if it differs by more than a pre-determined tolerance from the stored value. Program control then moves from block 420 to block 430.

In block 430, the electronic controller 55 calculates the rotational velocity of the shaft 15. The angular velocity is calculated by the following formulas (which refer to the graphical depiction of the signals shown in FIG. 3(b):

1. The derivative of the signal 40, 41 near the zero crossing is a function of the velocity of the shaft 15. However, the controller 55 cannot sense the zero crossing and must determine which of the signals x or y (40, 41) is closer to the zero crossing. Since the slope of the curve is steepest around the zero crossing and thus the magnitude of the derivative is the largest an embodiment of the control compares the derivative of each signal to determine which is larger. That signal is then used to calculate the velocity. To do this, we assume that $z = A \sin \omega t$, and $$z = \begin{cases} x & \text{if } \left|\frac{dx}{dt}\right| > \left|\frac{dy}{dt}\right| \\ y & \text{if } \left|\frac{dy}{dt}\right| > \left|\frac{dx}{dt}\right| \end{cases},$$

where A is amplitude and $$\frac{\omega}{2\pi}$$

is frequency of the sine wave 40, 41.

2. Differentiating z in 1 above with respect to time yields:

$$\frac{dz}{dt} = \omega \cos \omega t;$$

3. Now, $\omega$ can be expressed as:

$$\omega = \frac{\frac{dz}{dt}}{A \cos \omega t},$$

where $\cos \omega t$ is not readily available.

5. Solving the identity in 4 for $\cos \omega t$ yields: $\cos \omega t =$
6. Remembering that $\sin \omega t = \sqrt{1 - \sin^2 \omega t}$.

$$\frac{z}{A}$$

and substituting it into (5):

$$\cos \omega t = \sqrt{1 - \left(\frac{z}{A}\right)^2}.$$

7. Finally, plugging $\cos \omega t$, back into (3) gives us $$\omega = \frac{\frac{dz}{dt}}{A\sqrt{1 - \left(\frac{z}{A}\right)^2}}$$

which, distributing A within the square root in the denominator yields:

$$\omega = \frac{\frac{dz}{dt}}{\sqrt{A^2 - z^2}}$$

8. The speed of rotation of the disc is then going to be proportional to frequency, and is calculated as:

$$\therefore \text{Speed} = const \cdot \omega$$

From block 430, program control moves to block 440. In block 440, the controller determines the direction of movement of the axle 15 according to the following formula:

$$\frac{dx}{dt} > 0 \ \& \ \frac{dy}{dt} > 0 \ \& \ x < y \qquad A \rightarrow B$$

OR $$\frac{dx}{dt} > 0 \ \& \ \frac{dy}{dt} < 0 \ \& \ x > V^{mid} \ \& \ y > V^{mid} \quad B \rightarrow C$$

OR

-continued $$\frac{dx}{dt} < 0 \,\&\, \frac{dy}{dt} < 0 \,\&\, x > y \qquad C \rightarrow D$$

OR $$\frac{dx}{dt} < 0 \,\&\, \frac{dy}{dt} > 0 \,\&\, x < V^{mid} \,\&\, y < V^{mid} \qquad D \rightarrow A$$

$$\frac{dx}{dt} > 0 \,\&\, \frac{dy}{dt} > 0 \,\&\, x > y \qquad D \rightarrow C$$

OR $$\frac{dx}{dt} < 0 \,\&\, \frac{dy}{dt} > 0 \,\&\, x > V^{mid} \,\&\, y > V^{mid} \qquad C \rightarrow B$$

OR $$\frac{dx}{dt} < 0 \,\&\, \frac{dy}{dt} < 0 \,\&\, x < y \qquad B \rightarrow A$$

OR $$\frac{dx}{dt} > 0 \,\&\, \frac{dy}{dt} < 0 \,\&\, x < V^{mid} \,\&\, y < V^{mid} \qquad A \rightarrow D$$

where: $V^{mid}$ 32 amplitude/2.

From block 440, program control moves to block 450. In block 450, the portion of the program represented by FIG. 4 outputs speed and direction calculations to memory and to other subroutines requiring the speed and direction information for control and other requirements. Program control moves from block 450 to block 460 and the program ends. By using an embodiment of the foregoing invention, it is possible to sense accurately rotational velocities that are approaching or equal to zero. This is possible, in part, because the embodiment of the present invention uses a derivative of the signals produced by first and second non-contacting sensors 40, 45. Because the derivative is used, it is possible to distinguish between slow or zero movement and a failed sensor.

What is claimed is:

1. A system for sensing the rotational velocity and direction of an object about a rotational axis, the system comprising:
   a magnet fixed to the object whose rotational velocity is to be measured;
   a first non-contacting sensor, said sensor producing a first signal which is a function of the strength of the magnetic field emitted by said magnet;
   a second non-contacting sensor, spacially displaced from said first non-contacting sensor, said second non-contacting sensor producing a second signal in response to proximity of said magnetic object; and
   an electronic controller, said controller receiving said first and second signals, calculating a derivative of said first and second signals, determining which of said derivatives of said first and second signals is greater and using that derivative value to calculate the rotational velocity of said object, and calculating a direction of said object as a function of said derivatives of said first and second signals and the value of said first and second signals.

2. A system for sensing the rotational velocity of an object rotating about a rotational axis, the system comprising:
   a magnet attached to said object, wherein rotation of the object causes the magnet to move in a circular path on a plane perpendicular to said rotational axis;
   a first Hall effect sensor located adjacent said circular path of said magnet and substantially on the plane, said first hall effect sensor producing a first signal in response to said magnet passing adjacent said first hall effect sensor;
   a second Hall effect sensor located adjacent said circular path of said magnet, substantially on the plane, and a predetermined angular separation from said first hall effect sensor with respect to the rotational axis, said second hall effect sensor producing a second signal in response to said magnet passing adjacent said second hall effect sensor;
   an electronic controller, said controller receiving said first and second signals, calculating a first and second derivative of said first and second signals respectively, comparing the magnitude of said first derivative to the magnitude of said second derivative, determining the larger and producing said velocity signal as a function of said larger of said magnitudes, said velocity signal being indicative of the rotational velocity of said object, and producing a direction signal indicative of the rotational direction of said object, said direction signal being calculated as a function of said first and second derivative and the value of said first and second signal.

3. A method of determining the rotational velocity of an object rotating about a rotational axis, said object having a magnet mounted to said shaft, a first non-contacting sensor located adjacent said magnet and producing a first signal in response to the magnetic field density produced by the magnet in the area adjacent said first non-contacting sensor, a second non-contacting sensor producing a second signal in response to the magnetic field density produced by the magnet in the area adjacent said second non-contacting sensor, and an electronic controller receiving said first and second signals, said method including the steps of:
   determining a first derivative of said first signals;
   determining a second derivative of said second signals;
   calculating the magnitude of the derivatives of said first and second signals;
   determining the larger of the magnitudes of the derivatives of said first and second signals;
   selecting the derivative whose magnitude is larger;
   calculating a velocity of said object as a function of the selected derivative and;
   determining a direction of said object as a function of said first and second derivatives and a value of said first and second signal.

* * * * *

UNITED STATES PATENT AND TRADEMARK OFFICE
CERTIFICATE OF CORRECTION

PATENT NO. : 6,229,299 B1
DATED : May 8, 2001
INVENTOR(S) : Strashny

It is certified that error appears in the above-identified patent and that said Letters Patent is hereby corrected as shown below:

<u>Column 6,</u>
The formula at line 15 should appear as follows: $-- \omega = \dfrac{\frac{dz}{dt}}{A\cos\omega t} --$.

Line 22, should read as follows: -- 4. Solving the identity in 3 for cos $\omega$ yields: $\cos \omega t = \sqrt{1-\sin^2 \omega t}$. --.

Line 23, should appear as follows: -- 5. Remembering that $\sin \omega t = \dfrac{z}{A}$ --.

Line 29, should appear as follows: -- and substituting it into (4): --.
Line 35, please replace "7" with -- 6 -- therefor.
Line 51, please replace "8" with -- 7 -- therefor.
The formula at line 60, please insert the following heading:

-- | The disc is rotating in a clockwise direction (A-B-C-D-A as shown in Fig. 3(b)), if following conditions are satisfied: | Segment represented by logic | --.

UNITED STATES PATENT AND TRADEMARK OFFICE
CERTIFICATE OF CORRECTION

PATENT NO. : 6,229,299 B1
DATED : May 8, 2001
INVENTOR(S) : Strashny

It is certified that error appears in the above-identified patent and that said Letters Patent is hereby corrected as shown below:

Column 7,
The formula at line 10, please insert the following heading:

| | | |
|---|---|---|
| -- | The disc is rotating in a counterclockwise direction (D-C-B-A-D as shown in Fig. 3(b)), if following conditions are satisfied: | Segment represented by logic  --. |

Signed and Sealed this

Fifth Day of February, 2002

Attest:

Attesting Officer

JAMES E. ROGAN
Director of the United States Patent and Trademark Office